Oct. 26, 1926.

J. I. COPE

OBSERVATION SCREEN

Filed April 2, 1924

1,604,881

Inventor
John I. Cope
By
Attorney

Patented Oct. 26, 1926.

1,604,881

UNITED STATES PATENT OFFICE.

JOHN I. COPE, OF FAYETTE CITY, PENNSYLVANIA, ASSIGNOR TO THE COPE MANUFACTURING COMPANY, OF PITTSBURGH, PENNSYLVANIA, A CORPORATION OF DELAWARE.

OBSERVATION SCREEN.

Application filed April 2, 1924. Serial No. 703,764.

The present invention relates to improvements in observation screens adapted to be placed in the line of vision between a person's eye or eyes or other view point and a source of light for the purposes of preventing glare from such light and of indicating the relative position or direction of movement of such light, although affording ample clear vision to enable objects to be seen therethrough. The invention is more particularly adapted for use on automobiles or other vehicles for the purpose of protecting the driver or other occupant thereof from the effects of glare of bright or blinding headlights on an approaching automobile or vehicle.

A primary object of the invention is to provide a screen of the character referred to which is capable of reducing or preventing glare of bright or strong headlights to the extent that the blinding effect thereof is eliminated, although sufficient clear vision is afforded to enable objects to be clearly seen through the screen.

Another object of the invention is to provide a screen of this character which is capable of indicating visually to an automobile driver or occupant looking through the screen the relative position or the direction of movement of an approaching automobile bearing headlights, whereby such driver or occupant may know, by the indication afforded by the screen, whether the other or approaching automobile is on the proper side of the roadway to permit passage safely, or whether the other automobile is moving across the roadway.

A further object of the invention is to provide a screen of this character which is capable of indicating to the driver or occupant of an automobile its relative distance from an approaching automobile bearing headlights, thus conducing to the safe passage of automobiles or other vehicles at night, specially on unilluminated roadways.

To these and other ends, the invention consists in certain improvements which will be hereinafter set forth, the features of novelty being pointed out particularly in the claims at the end of the specification.

In the accompanying drawing:—

Figure 4:
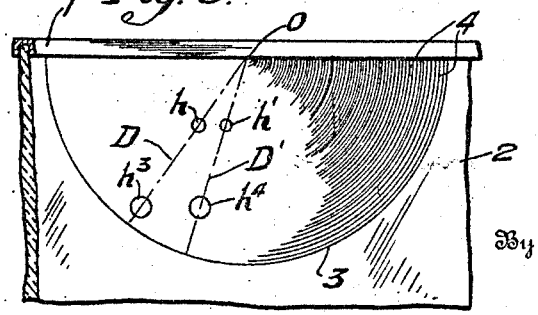
Figure 3:
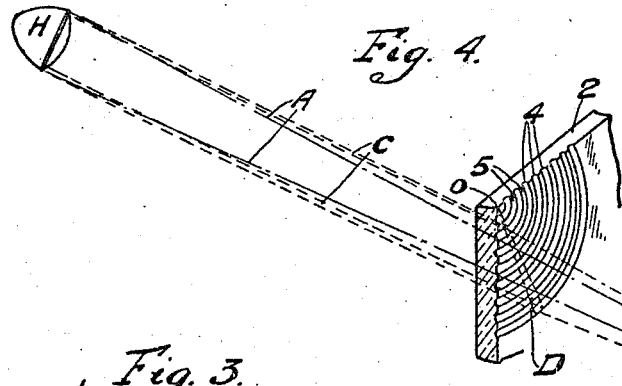

Figure 3 illustrates the screen as viewed in elevation from the rear, illustrating the visual indications respecting the position of an approaching automobile in a direction transversely of the roadway and also the relative distance of the approaching automobile from the screen; and Figure 4 is a diagrammatic view, illustrating how the light rays from a headlight pass through the screen to produce an image thereof in the eye of the observer and to also produce a visual indication of the relative position of the headlight in a direction laterally of the center of the screen.

Similar parts are designated by the same reference characters in the several views.

Observation screens constructed in accordance with the present invention are applicable to all situations where it is desirable or necessary to reduce or prevent the binding effects of a glaring light or lights in the eyes of an observer, for indicating the relative position of a light or illuminated object in front of the screen and in a direction laterally thereof, and for indicating the relative or approximate distance of an approaching light or illuminated object in front of the screen, or for any one or more of these purposes. The invention, however, is particularly applicable to automobiles and similar vehicles for the purpose of protecting the driver or occupant thereof from the effects of strong headlights on approaching automobiles while driving at night. The invention is shown, in the present instance, as applied to the glass or transparent panel of an automobile windshield, but it is to be understood that equivalent ways of applying the invention are contemplated and will be included within the scope of the claims.

In the present instance, 1 represents an automobile wind shield which may be of any of the usual or commonly used types and having a glass panel 2 which is commonly located directly in front of the driver or other occupant or occupants of the front seats of the automobile, a view of the roadway in front of the automobile being afforded by direct vision through the glass panel.

The observation screen embodying the present invention is indicated at 3, it occupying preferably an area of the wind shield glass of suitable size and preferably directly in front of the driver's point of vision, although it will be understood that the screen may be located at other points on the wind shield glass, it may be of different sizes to include more or less of the wind shield glass or, if desired, duplicate screens may be provided at the opposite sides of the wind shield glass for the use of the respective occupants of the front seat of the automobile. The screen comprises a modified surface of the glass panel 2, the screen being preferably formed on the rear side of the wind shield glass; and the screen is produced preferably by grinding the surface of the glass by moving an abrading implement in an arc of a circle having a definite or fixed center or axis to produce a great number of shallow closely spaced scratches or lines, the surface ground in this way being then polished by movement of a polishing medium in the same arcuate direction and about the same center on which the grinding operation was performed to finish the screen. For example, in swinging or moving the abrading tool to and fro a suitable number of times about the center $o$, a great number of shallow, closely spaced scratches or lines 4 are formed on the surface of the glass and these scratches or lines are all concentric with the center $o$. This center $o$ may be located either on or within the edge of the glass panel or it may be located beyond such edge, and the screen is preferably arcuate in form, substantially as shown. By grinding the smooth surface of a plate or drawn glass panel in the manner described, the concentric shallow, closely-spaced scratches, lines or grooves 4 are formed in the surface, as shown exaggerated in Figure 4, leaving intervening plane or ungrooved portions 5 of the surface of the glass panel, and by polishing the surface after the grinding treatment has been performed, these intervening plane or ungrooved portions 5 of the surface of the glass panel and the scratches, lines or grooves also, to some extent at least, are rendered sufficiently transparent to afford clear vision through the screen.

Figure 1:
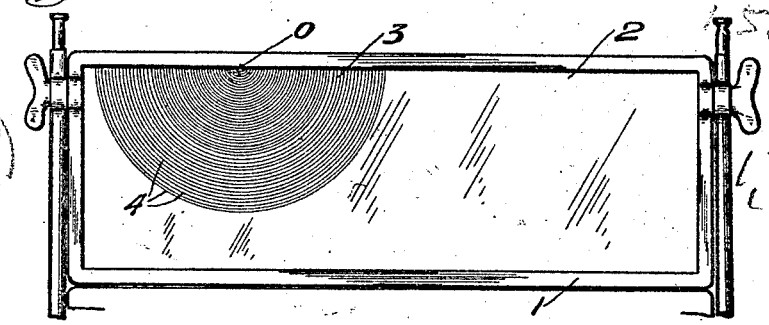
Figure 1 represents in elevation a conventional form of wind shield such as used upon automobiles, the glass or transparent panel of the wind shield being provided with a screen embodying the present invention.
Figure 2:
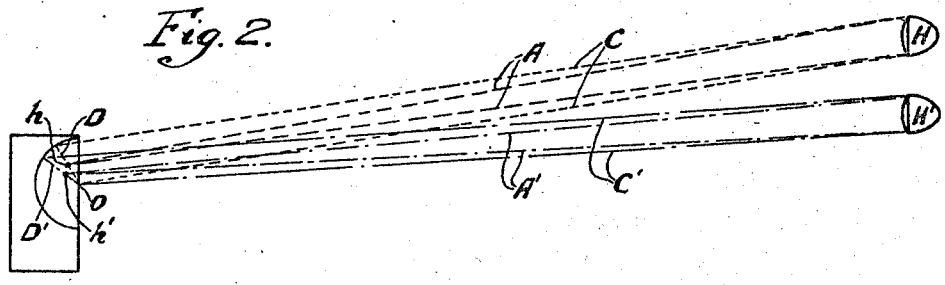
Figure 2 is a diagrammatic view illustrating the manner in which the light rays from the headlights of an approaching automobile are received upon the screen and the resulting visual indications on the screen respecting the position of the approaching automobile in a direction laterally of the roadway.

In using a screen of this character upon an automobile wind shield, the screen will occupy a position in front of the driver or occupant thereof, and in the line of vision of the driver or occupant when looking straight ahead. The screen is preferably located so that its center $o$ will be approximately or substantially in vertical alinement with the line of vision of the driver or occupant behind it when looking straight ahead. The illuminated headlights H and H' of an approaching automobile in front of the screen will project light upon the screen. The light beams A and A' from the headlights H and H', respectively, will pass through the screen to the eye or eyes of the observer behind the screen, producing clear images of these headlights in the eyes of the observer, which images appear to occupy the positions designated $h$ and $h'$, respectively, on the screen. The light rays C and C' from the headlights H and H' upon striking the screen will be reflected or refracted by the concentric lines 4 of the screen, thus producing luminous lines or bands D and D', both of which are radial to the center $o$ of the screen. If the point of vision E of the observer behind the screen is in vertical alinement with the center $o$ of the screen and the headlights of the approaching automobile are directly in front of the screen, the luminous lines or bands D and D' will extend substantially vertically to the center $o$ of the screen, thus indicating that the approaching automobile is directly in front of the screen. If, however, the headlights of the approaching automobile are to one side or the other of a perpendicular extending from the center $o$ of the screen, the luminous lines or bands D and D' will appear on the corresponding side of the screen. For example, in Figure 2 the headlights H and H' are to the left of the observer occupying a position behind the screen, in consequence of which the luminous lines or bands D and D' appear on the left-hand side of the screen, as viewed by the observer.

Furthermore, the screen may be used to indicate the approximate distance of an approaching automobile with illuminated headlights. When the illuminated headlights of the approaching automobile are at a considerable distance, the images $h$ and $h'$ will appear to be nearer the center $o$ of the screen and smaller in size and spaced more closely than when the approaching illuminated headlights are in closer proximity to the screen, the images of the headlights then appearing nearer the circumferential edge of the screen and larger and spaced apart a greater distance as, for example, as indicated at $h^3$ and $h^4$.

The screen provided by the present invention affords ample clear vision therethrough to enable an observer positioned behind the screen and looking through it to obtain a clear view of objects in front of the screen, although it will prevent glare in the eyes of the observer from strong or blinding headlights. Moreover, it affords an indication of the position or direction of movement of an automobile bearing illuminating headlights or an illuminated object in a direction transversely of a roadway, or the direction of movement of the automobile or vehicle carrying the screen, thus conducing to safe passage of automobiles or vehicles while travelling along roadways at night. Moreover, the screen affords an approximate indication of the distance of an approaching automobile bearing illuminating headlights, thus increasing the safety in the movements of automobiles. By forming the screen directly on the glass panel of the wind shield, the ordinary usefulness of the wind shield is not impaired and, moreover, the functioning of the screen is not impaired or altered if the wind shield glass is placed at different inclinations to the vertical, so that the use of the screen may be continued, although it is formed on the hinged or ventilating panel of a wind shield and such panel is swung upwardly to different angles.

I claim as my invention:—

1. An anti-glare observation screen for vehicle windshields located in the line of vision therethrough and comprising a transparent panel having a series of concentric shallow lines ground in a surface thereof with intervening plane clear vision portions, said lines and clear vision portions forming a screen through which objects in front thereof may be seen, the lines being operative to produce from the light rays from an illuminated object in front of the screen, in the eyes of an observer behind it, a luminous band which is radial to said concentric lines and which shifts angularly in accordance with relative movements of the object in directions transverse to the line of vision, thus indicating to the observer behind it the relative positions of the object in front of the screen.

2. A windshield for vehicles comprising a transparent panel having a series of concentric grooves formed in a surface thereof and occupying an arcuate area thereon in the line of vision therethrough, and plane clear vision portions of said surface intervening between the grooves, said grooves and intervening clear vision portions forming an anti-glare observation screen through which an illuminated object in front of it may be observed and which will produce from the light rays from such object, and in the eyes of an observer behind the screen, luminous bands which occupy different angular positions according to the relative positions occupied by the illuminated object.

3. An anti-glare screen for automobile windshields comprising a sheet of glass having an arcuate area of a surface thereof formed with a series of concentric lines which will produce in the eye of an observer behind the screen viewing through the screen a light in front thereof an image of a luminous band which extends radially of said lines, the screen also embodying clear-vision areas between said concentric lines through which objects in front of the screen will be visible.

4. An automobile windshield having the portion of the surface of its glass panel in the line of vision therethrough formed with a series of concentric lines with intervening plane clear vision areas, said lines being operative to produce in the eye of an observer behind the windshield viewing therethrough a light in front of the windshield an image of a luminous band which appears radial to said concentric lines and at an angle about their center which is determined according to the lateral position of the light in front of the windshield.

In testimony whereof I have hereunto set my hand.

JOHN I. COPE.